United States Patent [19]

Rohde et al.

[11] Patent Number: 4,858,480
[45] Date of Patent: Aug. 22, 1989

[54] SWASH PLATE SWIVEL BEARING FOR A HYDRAULIC AXIAL PISTON MACHINE

[75] Inventors: Rolf Rohde, Elchingen; Gunter Ritter, Nersingen, both of Fed. Rep. of Germany

[73] Assignee: Hydromatic GmbH, Elchingen, Fed. Rep. of Germany

[21] Appl. No.: 794,747

[22] Filed: Nov. 4, 1985

[30] Foreign Application Priority Data

Nov. 20, 1984 [DE] Fed. Rep. of Germany ....... 3442391

[51] Int. Cl.$^4$ .......................... F16H 23/00; F04B 1/26
[52] U.S. Cl. ......................................... 74/60; 417/222; 417/269; 92/12.2; 91/505
[58] Field of Search .......................... 74/60, 839, 838; 417/222, 269; 92/12.2; 91/505; 384/523

[56] References Cited

U.S. PATENT DOCUMENTS

| | | | |
|---|---|---|---|
| 1,131,694 | 3/1915 | Goble | 384/523 |
| 1,198,370 | 9/1916 | Neighbour | 384/523 |
| 2,465,510 | 3/1949 | Bonnafe | 74/60 |
| 3,678,807 | 7/1972 | Papst | 74/60 |
| 4,280,359 | 7/1981 | Schmid et al. | 74/60 |
| 4,294,139 | 10/1981 | Bex et al. | 74/60 |
| 4,563,915 | 1/1986 | Tibbals, Jr. | 74/60 |
| 4,712,982 | 12/1987 | Inagaki et al. | 417/269 X |
| 4,727,761 | 3/1988 | Scalzo | 74/60 |
| 4,782,712 | 11/1988 | Takahashi et al. | 74/60 |

FOREIGN PATENT DOCUMENTS 2625298 12/1977 Fed. Rep. of Germany .
2826928 1/1980 Fed. Rep. of Germany .

Primary Examiner—Peter M. Cuomo
Attorney, Agent, or Firm—Scully, Scott, Murphy & Presser

[57] ABSTRACT

The invention relates to a swash plate swivel bearing for a hydraulic axial piston machine, in which roller-bearing segments are arranged between the hollow cylindrical bearing surface for the swash plate in the housing and the cylindrical bearing surface on the swash plate, which segments are held in curved cages with each of which is associated a tracker having a tracking mechanism guided by a guide member in a first guide, which mechanism is in drive connection with a carrier of the cage. It is the object of the invention to design a swash plate swivel bearing of the construction indicated above so that the guide member can cooperate directly with the carrier of the cage. This is achieved by forming the first guide (23) by two guides grooves (24, 25) that are opposed and, in particular, symmetrically inclined towards the direction of movement (29), the guide grooves crossing one another and being arranged on opposed and substantially parallel surfaces (26,27) on the housing side and on the swash plate side, the guide member (21) being guided in the guide grooves (24,25) always at their point of intersection (31).

15 Claims, 2 Drawing Sheets

4,858,480

SWASH PLATE SWIVEL BEARING FOR A HYDRAULIC AXIAL PISTON MACHINE

TECHNICAL FIELD OF THE INVENTION

The invention relates to a swash plate swivel bearing.

BRIEF DESCRIPTION OF THE PRIOR ART

A swash plate swivel bearing of this construction is described and shown in DE-OS 28 26 928. In this known construction the swash plate swivel bearing has associated with a tracker which prevents the cage accommodating the roller-bearing elements from sliding out of its prescribed field of movement, namely out of its most favorable position in the swivel bearing. In the absence of a tracker such sliding out can occur because the roller-bearing elements, besides making rolling movements, also make gliding movements due to rapid swivelling movements and/or vibrations and/or the moment of inertia of the roller-bearing segment, which lead to displacements of the roller-bearing segment in the bearing. This leads to an unfavorable position of the bearing segment or segments in relation to the direction of the load.

With the known device, the tracking mechanism consists of an angle lever mounted to swivel freely about an axis aligned parallel to the swivel axis, which at its one end is in driving connection with the carrier of the cage and at its other end is guided in the first guide by the guide member. With swivelling movements of the swash plate the angle lever also swivels about its axis, always in a direction opposed to the swivelling direction of the swash plate. The known design has many parts and is movementintensive. Hence there is a relatively large number of sliding contacts which inevitably lead to wear and to increased play within the tracking mechanism.

OBJECT OF THE INVENTION

The object underlying the invention is to design a swash plate swivel bearing of the construction indicated in the introduction such that the guide member can cooperate directly with the cage carrier.

SUMMARY OF THE INVENTION

With the design according to the invention, while the guide member can be displaced along each guide groove or each guide flange, the mutually crossing arrangement results in forced guidance for the guide member. This forced guidance makes it possible to allow the guide member to cooperate directly with the carrier. It is then possible, by special shaping of the guide tracks formed by the guide grooves, to dispense with a second guide, which, with substantially equal and symmetrical angles of inclination, makes relative movement of the guide member and the carrier possible.

With substantially equal and symmetrical angles of inclination of the guide grooves, the guide member is forced to move in a direction inclined towards the direction of movement and the roller-bearing segment is forced to move in the circumferential direction. The latter movement is in a ratio of approximately 1:2 to the swivelling movement of the swash plate.

With the design according to the invention, the transmission ratio between the swivelling movement of the swash plate and the movement of the roller-bearing segment is determined by the angle of inclination of the guide grooves and by the orientation of the second guide. Equal angles of inclination result in a transmission ratio of the movements of approximately 1:2, as already described. In contrast, unequal angles of inclination, and orientations of the second guide that deviate from the radial orientation, result in higher or lower transmission ratios.

With the design according to the invention it must be taken into account that the ratio of the movement of the roller-bearing segment to that of the swash plate is not exactly 1:2 because of the different radii of the bearing surfaces. The difference is, however, very slight.

Experiments have, however, shown that straight and symmetrically inclined guide grooves and a radial orientation of the second guide result in an operative tracker.

The features pursuant to the invention provides not only for the guide grooves but also for the guide member, which in this case is in the form of a simple ball.

According to space requirements and construction, embodiments pursuant to the invention can be realized, in which the guide and the carrier extend either parallel to the bearing surfaces or perpendicular to the bearing surfaces. In the first case guide surfaces curved to correspond to the bearing surfaces are required. In the second case the guidance is on flat surfaces.

Within the scope of the invention numerous intermediate positions are, of course, possible. Theoretically a range of approximately 180° is available within which numerous different angular positions of the carrier or of the guide are possible.

The construction pursuant to the invention includes a simple embodiment, which can be particularly easily and economically made if the cage and the carrier consist of synthetic material.

BRIEF DESCRIPTION OF THE DRAWINGS

Three exemplary embodiments of the invention will now be described in more detail with reference to a simplified drawing.

There is shown in.

DETAILED DESCRIPTION OF THE INVENTION

Figure 1:
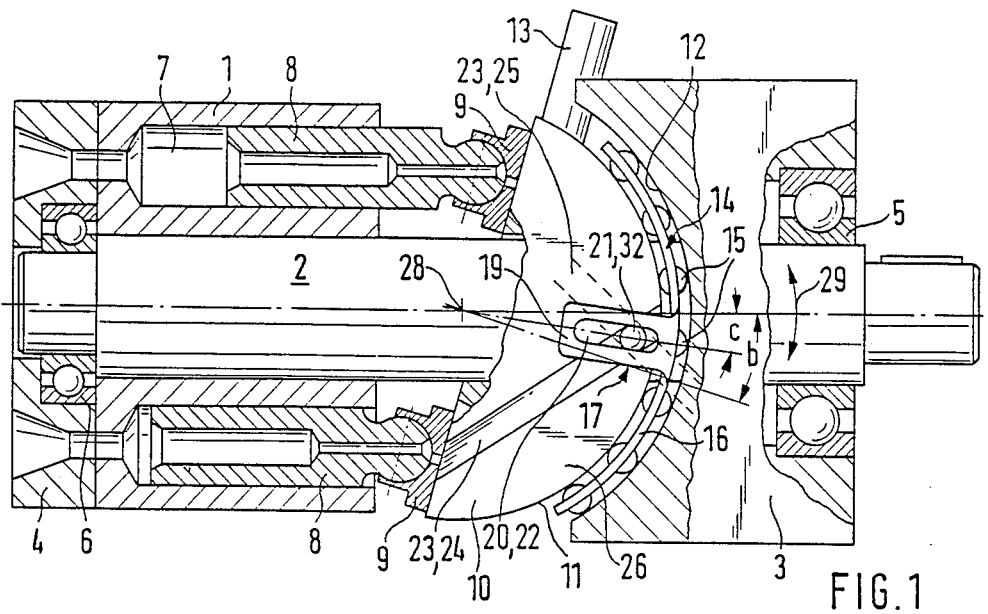
FIG. 1 an axial piston machine with a swash plate swivel bearing designed according to the invention, with a tracker in partial longitudinal section.

According to FIG. 1 the axial piston machine consists of a cylinder drum 1 arranged on a shaft 2, which is either a drive shaft or a driven shaft depending on whether the machine is used as a pump or as a motor. The shaft 2 is carried in a housing, indicated simply by the housing parts 3 and 4 in bearings 5 and 6. Within the cylinder drum 1 and within cylinder bores 7 are arranged pistons 8 which bear against a swash plate via bearing shoes 9. The swash plate 10 has a cylindrical bearing surface 11, which lies opposite a hollow cylindrical bearing surface 12 in the housing part 3. The stroke of the pistons 8 in the cylinder bores 7 is varied in known manner by varying the angular position of the swash plate 10 with respect to the axis of the shaft 2. For example, an adjusting device (not shown) may act on a lever 13 firmly connected to the swash plate 10. A roller-bearing segment 14, whose rollers 15 are guided and held by a cage 16, is arranged in the gap between the bearing surfaces 11 and 12.

Figure 3:
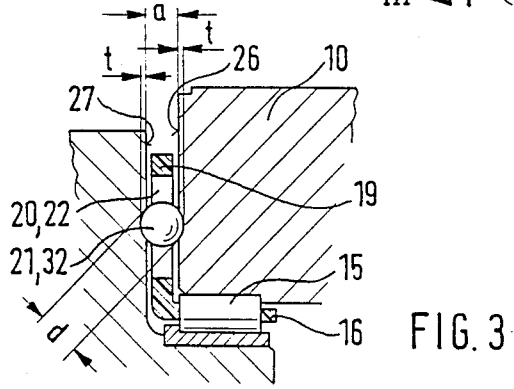
FIG. 3 a section through the swash plate swivel bearing on the line III—III in FIG. 2.

The tracker according to the invention is indicated generally by 17 and includes a carrier 19 on the cage 16, a guide member 21 which engages the carrier 19 through a radially oriented elongated hole 22, and a first guide for the guide member 21 indicated generally by 23 and formed by two guide grooves 24, 25, which are machined in opposing surfaces 26, 27 (FIG.3) that extend perpendicular to the bearing surfaces 11, 12 and perpendicular to the swivel axis 28 of the swash plate 10. The elongated hole 22 forms a second guide 20 for the guide member 21, which guide makes relative radial movement between the guide member 21 and the carrier 19 possible.

Figure 2:
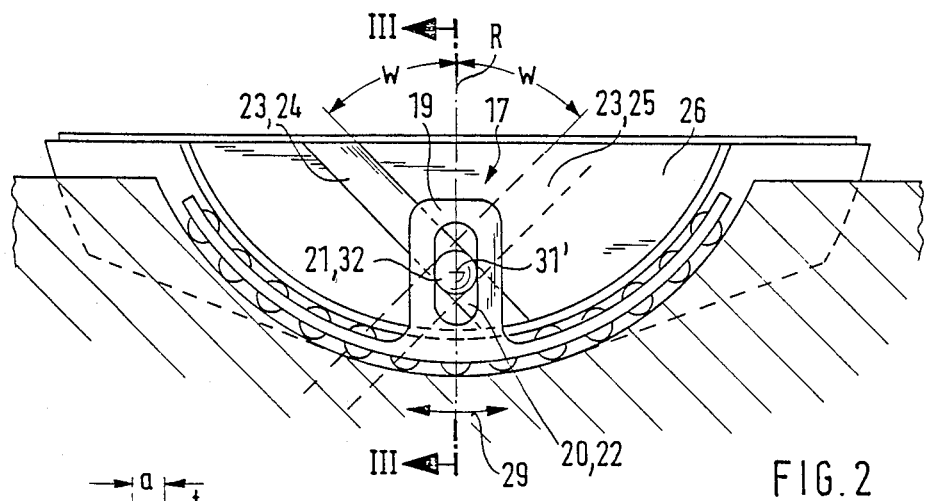
FIG. 2 the swash plate bearing according to FIG. 1, in the O-position and on a somewhat larger scale.

As can best be seen in FIG.2, the guide grooves 24, 25, of which the guide groove 24 can be seen in the swash plate 10 and the invisible guide groove 25 is indicated in the housing part 3 by dotted lines, are symmetrically inclined to the direction of movement 29 or to the radius R which passes in each case through the guide member 21, at the angle w. The guide grooves 24, 25 cross one another and thus form a guide location 31 for the guide member 21 which is always located at the point of intersection of the guide grooves 24, 25.

The guide member 21 is formed by a ball 32, and the guide grooves 24, 25 are rounded to correspond to the ball 32. The ball 32 is accommodated in the guide grooves 24, 25 without any appreciable play, that is to say, the diameter d of the ball 32 corresponds to the sum of the groove depths t and the distance a between the surfaces 26, 27. The carrier 19, which is at right angles to the cage 16 and is inclined radially inwards, is thinner than the distance a between the surfaces 26, 27 (FIG.3), so as to maintain some clearance on both sides.

With equal and opposite angles of inclination w, when the swash plate 10 swivels, the ratio of its swivelling movement b to the swivelling movement c of the roller-bearing segment 14 is 2:1. The difference between the swivelling distances b and c after swivelling of the swash plate 10 can clearly be seen in FIG.1.

Figure 4:
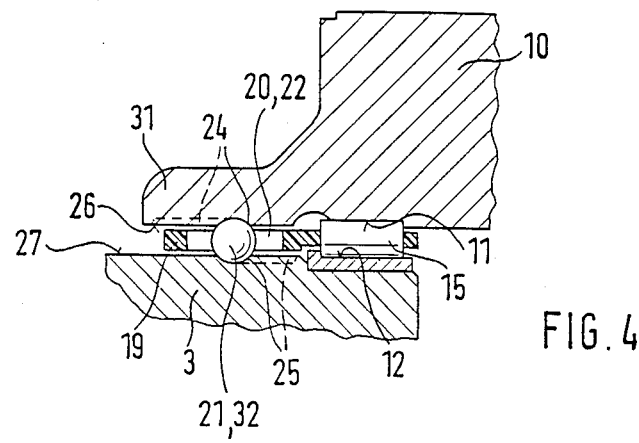
FIG. 4 a section corresponding to FIG.3 through a swash plate swivel bearing, as a second exemplary embodiment.

The second exemplary embodiment according to FIG.4 is distinguished from the first in that the surfaces 26, 27, the guide grooves 24, 25 and the carrier 19 do not extend transverse to the bearing surfaces 11, 12, but parallel to them. Hence the surfaces 26, 27 are curved in the shape of circular arcs in the same manner as the bearings surfaces 11, 12 and thus form lateral extensions of the bearing surfaces 11, 12. In this exemplary embodiment the swash plate 10 and the housing part 3 carrying it have correspondingly different forms.

To realize the surface 27, the housing part 3 is further recessed and the swash plate 10 exhibits a lateral annular shoulder 31, on which the surface 26 opposite to the surface 27 is formed. The guide grooves 24, 25 are likewise inclined towards the direction of movement, which in FIG.4 is perpendicular to the plane of the drawing, and they also cross one another in the manner corresponding to the first exemplary embodiment. In FIG.4 the inclined and transverse course of the guide grooves 24, 25 cannot be seen.

Figure 5:
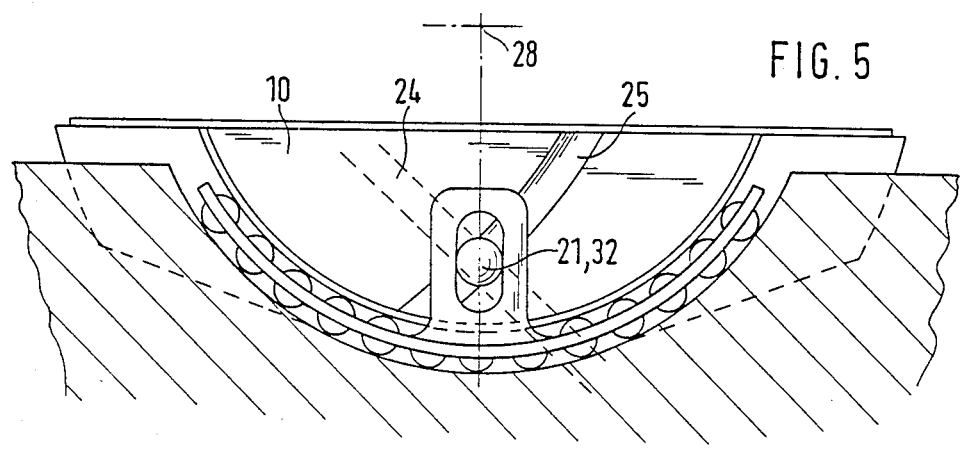
FIG. 5 a view corresponding to FIG. 2 of a swash plate swivel bearing, as a third exemplary embodiment.

As already mentioned, with equal and opposite angles of inclination w, the swivelling movements b of the swash plate 10 are in a ratio of 2:1 to the swivelling movements c of the roller-bearing segment 14. Here the absolute angle (w + w) has no influence on the transmission. If the angles w are differently inclined to the radius R, correspondingly different transmission ratios result. These, however, then vary with the swivel position of the swash plate 10, owing to the guide point or point of intersection 31 (point of application of the force) of the guide member 21 wandering on the radius R. The transmission error is dependent upon the absolute inclination of the guide grooves 24, 25. The transmission error can be eliminated by curving at least one guide groove 24, 25, as is shown in FIG.5 as a third exemplary embodiment. In this exemplary embodiment, the guide groove 25 in the swash plate 10 is curved: in fact, seen from the swivel axis 28 it is convexly curved.

A further possible way of both varying the transmission ratio and eliminating transmission errors consists in shaping the crank guide formed by the elongated hole 22 so as to be inclined towards the radius R or also simultaneously curved. In this case all three guide tracks must, of course, correspond.

Within the scope of the invention it is possible to form the guide 23 by means of other guides, e.g. through guide flanges, whose guiding cross-section can be varied. Corresponding guide surfaces must then also be formed on the guided member 21.

It is also possible within the scope of the invention to replace the guide grooves 24, 25 by guide flanges. Guide flanges differ from guide grooves merely in that they project from the surfaces 26, 27, and thus form equivalent guide means.

What is claimed is:
1. An axial piston machine, comprising:
a housing;
a drum supported by the housing for rotation about a rotary axis, and defining a plurality of cylinder bores;
a plurality of pistons extending into the cylinder bores, and supported for rotary movement with the drum and reciprocating movement within the cylinder bores;
a shaft extending into the housing to rotate with the drum;
a swash plate connected to the pistons to transmit selectively rotary movement of the drum into reciprocating movement of the pistons, and reciprocating movement of the pistons into rotary movement of the drum, the swash plate defining a curved bearing surface and being supported by the housing for pivotal movement about a pivot axis;
the housing further including means defining a curved bearing surface located opposite the bearing surface of the swash plate to support the swash plate in the housing;
a plurality of bearing means located between the bearing surfaces of the swash plate and the housing to facilitate relative movement therebetween;
a cage holding the bearing means between said bearing surfaces;
the swash plate formed with a first groove extending away from the bearing surface thereof;
the housing formed with a second groove crossing past the first groove, the first and second grooves forming a recess spaced from the bearing surfaces and moving toward and away from the bearing surfaces as the swash plate pivots about the pivot axis;

a carrier connected to the cage and extending therefrom and between the first and second grooves; and a guide ball closely held in the recess, against both the swash plate and the housing, and moving with the recess as the swash plate pivots, the guide ball engaging the carrier and moving the carrier, the cage and the bearing means as the swash plate pivots about the pivot axis.

2. An axial piston machine according to claim 1, wherein:

the carrier is formed with a third groove extending away from the cage; and the guide ball extends into the third groove and moves therewithin, toward and away from the cage, as the swash plate pivots relative to the bearing surface of the housing.

3. An axial piston machine according to claim 2, wherein:

the carrier includes an elongated through opening forming the third groove; and the guide ball extends through the through opening of the carrier.

4. An axial piston machine according to claim 1, wherein:

the swash plate includes a first planar surface, and the first groove is formed in and longitudinally extends along said first planar surface;

the housing includes a second planar surface, opposite the first planar surface, and the second groove is formed in and longitudinally extends along the second planar surface; and at least one of the first and second grooves longitudinally curves along the respective planar surface.

5. An axial piston machine according to claim 1, wherein:

the housing includes a planar surface; and the second groove is formed in and longitudinally curves along said planar surface.

6. An axial piston machine according to claim 1, wherein each of the first and second grooves has a rounded cross section.

7. An axial piston machine according to claim 1, wherein:

the swash plate includes a first curved surface aligned with the bearing surface of the swash plate, and the first groove is formed in said first curved surface;

the housing includes a second curved surface axially aligned with the bearing surface of the housing, and the second groove is formed in said second curved surface; and the carrier extends between the first and second curved surfaces, parallel to the bearing surfaces of the swash plate and the housing.

8. An axial piston machine according to claim 1, wherein:

the first groove is formed in a first planar surface;

the second groove is formed in a second planar surface;

each of the first and second surfaces is perpendicular to the pivot axis; and the carrier extends toward the pivot axis, parallel to said first and second planar surfaces.

9. An axial piston machine according to claim 1, wherein the carrier is integrally connected to the cage.

10. A tracker means for a movable cage of a segment roller bearing of a rocking device of a hydraulic axial piston machine of the swash plate type, the rocking device defining a curved bearing surface supported by a curved bearing surface of a housing of the machine for pivotal movement about a pivot axis, the cage having a carrier which is movable in the direction of movement of the cage in an interlocking manner and transversely with clearance, and the carrier being guided by a guide track firmly connected to the housing of the machine, characterized in that the guide track is formed by two guide grooves that are inclined in an opposite direction to the direction of movement of the cage and cross one another to form an intersecting area, said intersection area being spaced from the bearing surfaces and moving toward and away from the bearing surfaces as the rocking device pivots, a first of the guide grooves being arranged in a surface of the housing, and the second of the guide grooves being arranged in a surface of the rocking device opposite the first guide grooves, in that a guide ball engages the carrier and is freely guided and closely held in the guide grooves at the intersecting area, and in that, as the rocking device pivots, the guide ball moves with said intersecting area and moves the carrier and the cage.

11. A tracker means according to claim 10, characterized in that the carrier is formed on the cage in one piece and has an elongated hole for receiving the guide ball.

12. A tracker means according to claim 11, characterized in that the curved bearing surface of the rocking device defines a radial direction, and in that the elongated hole in the carrier is arranged diagonally to said radial direction.

13. A tracker means according to claim 10, characterized in that at least one of the guide grooves is curved in the swivel plane.

14. A tracker means according to claim 10, characterized in that the guide grooves extend in a cylindrical bearing surface of the rocking device and in a hollow cylindrical surface in the housing.

15. A tracker means according to claim 10, characterized in that the guide grooves extend in a lateral surface of the rocking device and in an opposite housing surface.

* * * * *

UNITED STATES PATENT AND TRADEMARK OFFICE
CERTIFICATE OF CORRECTION

PATENT NO. : 4,858,480

DATED : August 22, 1989

INVENTOR(S) : Rolf Rohde, et al.

It is certified that error appears in the above-identified patent and that said Letters Patent is hereby corrected as shown below:

Column 1, line 25: "known device" should read as --known tracking device--

Column 6, line 23, Claim 10: "intersection" should read as --intersecting--

Signed and Sealed this

Thirty-first Day of July, 1990

Attest:

HARRY F. MANBECK, JR.

*Attesting Officer*      Commissioner of Patents and Trademarks